Patented June 20, 1939

2,163,133

UNITED STATES PATENT OFFICE 2,163,133

SULPHONATED AND ACETYLATED ALCOHOLS AND HYDROXY ACIDS AND SULPHONATED AND HYDROLYZED DERIVATIVES THEREOF

Walther Schrauth, Berlin-Dahlem, Germany, assignor, by mesne assignments, to "Unichem" Chemikalien Handels A.-G., Zurich, Switzerland, a corporation of Switzerland No Drawing. Application February 11, 1932, Serial No. 592,441. Renewed September 23, 1936. In Germany February 11, 1931

32 Claims. (Cl. 260—458)

The present invention relates to sulphates and sulphonates of unsaturated fatty substances and to processes of producing the same.

The invention has for an object to produce certain sulphates and sulphonates, for convenience herein termed "sulpho-compounds" and to provide an improved method of producing the same.

Unsaturated fats and fatty substances containing hydroxyl groups react with sulphating and/or sulphonating agents in two ways; the hydroxyl group may esterify or the double bond may become saturated by means of an addition process.

It is well known that, under usual technical conditions, sulphuric acid reacts solely with the hydroxyl group, and that even if a larger quantity of sulphuric acid is added, the saturation of the double bond proceeds but slowly and incompletely. It is however, further known that the reaction at the OH group occurs quickest with a slightly raised temperature (approximately 30–35° C.), whereas for saturating reactions of the double bond, longer reaction periods with the lowest possible temperatures are of advantage. The reaction at lower temperatures cannot, however, without difficulty be commercially carried out, owing to the fact that fatty acids as well as higher molecular fatty alcohols, likewise in combination with sulphuric acid, solidify at temperatures above 0° into gelatinous or high viscosity masses which can no longer be stirred.

I have now found that acylated, especially acetylated unsaturated fatty alcohols and acylated unsaturated hydroxy fatty acids, respectively, do not have this disadvantageous quality of solidifying at such temperatures. I have determined that even with a relatively high temperature of approximately 20–30° C. the acylated fatty alcohols and hydroxy fatty acids with sulphuric acid, sulphuric acid containing anhydride etc., react solely through saturation of the double bond, and that on the other hand, however, the sulphating or sulphonating material remains sufficiently liquid even at temperatures below 0°, so that with the aid of the usual stirring devices, a thorough stirring or agitation of the substance is possible. The sulpho-compounds obtainable in this way are, by virtue of their stability towards acids, as well as their clear solubility which is equally good in hard water, superior to the sulpho-compounds prepared in accordance with the conventional process.

In consideration of the experience gained in prior practice such a result was not expected. Although it is well known that the hydroxyl group can, with certain other reactions be protected, e. g. by means of acylation including esterification and etherification, a method of such a nature did not appear applicable for sulphating and sulphonating reactions, for it is known that the sulphating and sulphonating agents have a saponifying effect, e. g. on the fatty acid glycerin esters.

In accordance with the present invention, it is also possible to obtain by progressive sulphation and sulphonation products which are sulphated or sulphonated at the double bond as well as at the hydroxyl group. It was established that oleic alcohol acetate, for example, absorbs at a temperature of more than 35° an additional quantity of sulphuric acid and that such reaction is accompanied by the splitting off of acetic acid resulting in products which may be used with advantages equal to those obtained by the use of the normal oleic alcohol sulphonates. For example they produce entirely clear solutions, in consequence of the ready solubility of their lime salts when used with hard water. By vigorous hydrolysis of the sulpho-compounds resulting from this treatment, the preparation of hard fatty products from the sulpho-compounds is possible; in this case there are formed the saturated dihydroxyl derivatives which correspond to the initial materials. This hydrolysis is quite successful with such sulpho-compounds as are prepared with non-anhydride sulphuric acid.

The new process above described is not inferior to the conventional processes considered from an economic point of view, as the acetic acid can be recovered in the form of acetyl chloride after the production of the highly sulphated and/or sulphonated fatty products. This result may be accomplished if, after saturation of the double bond, chlorosulphonic acid is added and allowed to act at temperatures above 35°. In this case the acetic acid is split off as acetyl chloride with simultaneous conversion of the hydroxyl group into the acid sulphuric acid ester. The acetyl chloride can be recovered by distillation. The application of a considerable excess of sulphating and/or sulphonating agents, and the removal of large quantities of sulphuric acid dependent on it, which have not entered into reaction, is unnecessary, as there is no water present to influence the reaction in an adverse sense. It is further unnecessary to employ pure fatty constituents as initial material. The mixture of fatty acids obtainable from castor oil without purification is quite satisfactory. Furthermore, alcohols obtainable from sperm oil or Doeglin blubber may be used, and as well also containing saturated fatty substances. When saturated fatty substances, for example, higher molecular alcohols, are contained in the initial material treated, esterification of such saturated substances generally occurs at the hydroxyl group, the esterifying acid radical thereafter being either wholly or partly removed by the sulphonation reaction at the higher temperatures disclosed herein. The final product in such instance, therefore, will contain sulphonated higher molecular saturated alcohols.

The foregoing description indicates the reactions as it is believed they take place in the process described. It is believed that the product produced by acylation of an unsaturated high molecular alcohol and thereafter the reaction of this ester with sulphuric acid is of the general formula—

wherein R—C—R represents the higher molecular alkyl radical, X represents a neutralized sulphate or sulphonate radical which it may be observed is attached to the side of the chain and Y represents a lower molecular acyl radical, attached to the end of the R chain.

The exact reactions are not positively known. It is entirely possible that the reaction of the acetic acid, for example, with the oleyl alcohol takes place in part at the side of the chain as well as at the end of the chain and it is furthermore possible that during the first subsequent reaction with sulphuric acid some of the sulphuric acid radicals react with OH groups not previously reacted at the end of the chain or that a reaction takes place whereby some of the acyl groups at the end of the chain are replaced by sulphuric acid radicals. Thus the product obtained cannot be described by formula with assurance that the formula accurately represents the composition of the whole reaction product.

Example 1

Technical oleyl alcohol (iodine number 75) is converted into the acetic acid ester by esterification with acetyl chloride. The raw esterification product is reacted with 60% of its weight of sulphuric acid monohydrate at 20°, washed with a solution of sodium sulphate and neutralized with a solution of caustic soda. The resulting product is a clear yellow oil clearly soluble in water, which is not precipitated out by calcium chloride, which foams violently in a watery solution and which exhibits Turkey-red oil-like qualities.

Example 2

Oleyl alcohol is esterified with acetyl chloride and sulphated and/or sulphonated in accordance with Example 1. After being left standing for 12 hours it is then heated up to 40–45° and a further 30% of its weight of 98% sulphuric acid is added. The product is worked up as described in Example 1. It is but a little darker than that of Example 1. It dissolves clearly in distilled as well as in hard water (20° hardness German scale.)

Example 3

Raw fatty alcohol (iodine number 40) obtained from sperm oil (100 parts by weight) is heated with acetic anhydride (40 parts by weight) up to 130–140°. The temperature is gradually increased till no more acetic acid distils off. The reaction compound is cooled down to 20° and 40 parts by weight of 96% sulphuric acid are gradually added while stirring at this temperature and left standing for 12 hours at the same temperature. Thereafter 10 times the quantity of water is added. Boil several hours and let subside. Following this procedure, the separated reaction compound still contains slight quantities of acetic acid bound as an ester, which can be removed by boiling with a solution of caustic soda. The final product obtained comprises 102 parts by weight of a hard wax-like material melting at 52°, which emulsifies readily in water, contains slight quantities of soap or soapy substances and possesses an iodine number of 4.6.

Example 4

Acetic ricinoleic acid is reacted with 45% of its weight of sulphuric acid monohydrate as mentioned in Example 1, after which the product is washed and neutralized. The resulting mass is a textile oil or treating agent having similar qualities to those mentioned in Example 1.

By further treatment at increased temperature in accordance with Example 2, the oil absorbs further quantities of sulphuric acid. By hydrolysis a hard fat-like material can be obtained which contains principally dihydroxy stearic acid.

Natural fats and waxes such as cocoanut oil, palm oil, wool fat, beeswax and the like may be treated in similar manner to produce desirable technical products. The acylation and sulphonation are thereby seen to be applicable to the treatment of saturated and unsaturated compounds.

It may be noted that the fatty alcohols derived from cocoanut oil and the other natural fats and waxes contain, with minor exceptions, 8 or more carbon atoms in the molecule.

I claim:

1. The process of preparing sulpho-compounds which comprises reacting with a strong sulphonating agent lower molecular aliphatic esters of unsaturated high molecular alcohols corresponding in number of carbon atoms to the fatty acid components contained in the natural fats and waxes, said esters having a lower solidification point than the free alcohols of said esters.

2. The process of preparing sulpho-compounds which comprises converting oleyl alcohol into the acetic acid ester by esterification with acetyl chloride and reacting with concentrated sulphuric acid at approximately 20° C., washing the product with sodium sulphate and neutralizing with a solution of caustic soda.

3. The process of preparing sulpho-compounds which comprises acylating oleyl alcohol by replacing the OH group with a carboxylic acyl oxy group and introducing an OSO₂OH group at the double bond and thereafter replacing the acyloxy group by an SO₂OH group.

4. The process of preparing sulpho-compounds which comprises esterifying oleyl alcohol with acetyl chloride and reacting the product with concentrated sulphuric acid.

5. The process of producing sulpho-compounds from unsaturated alcohols which comprises protecting the hydroxyl group by esterification with a carboxylic acyl radical, said ester having the quality of withstanding saponification or splitting until sulphonation at the double bond of the alcohol has occurred, and reacting the resulting product with the sulphating agent.

6. The process of producing sulpho-compounds from unsaturated alcohols which comprises esterification at the hydroxyl group with a carboxylic acyloxy group to obtain an acyl ester, and reacting the ester so obtained with material of the group consisting of concentrated sulphuric acid and chloro-sulphonic acid to saturate the double bond and introduce an OSO₂OH group at the double bond position.

7. The process of producing sulphuric acid esters from material of the group consisting of unsaturated alcohols and unsaturated hydroxy acids which comprises treating such compounds to esterify the same to obtain a lower molecular carboxylic acid ester, treating the ester so obtained to saturate the double bond and introduce an acid sulphate group at the double bond position, and treating the product to substitute an acid sulphate group for the acyloxy group to produce a double sulphuric acid ester.

8. The process of producing sulpho-compounds from material of the group consisting of unsaturated alcohols and unsaturated hydroxy acids which comprises treating such compounds to protect the OH group by esterification with a carboxylicacyl radical, said ester having the quality of withstanding saponification or splitting until sulphonation at the double bond of the alcohol has occurred, reacting the said material to introduce an OSO₂OH group at the double bond position and further reacting the product to introduce an OSO₂OH group at the carbon atom attached to the OH-radical thereby replacing the OH radical.

9. The process of producing dihydroxy compounds from material of the group consisting of unsaturated alcohols and unsaturated hydroxy acids which comprises treating such material to esterify the same to obtain a carboxylic acyl ester, treating the ester so obtained to saturate the double bond and introduce an acid sulphate group at the double bond position, treating the product to substitute an acid sulphate group for the acyloxy group to produce a double sulphuric acid ester and hydrolyzing this double ester to substitute hydroxyl groups for the acid sulphate groups.

10. The process of producing sulpho-compounds from unsaturated alcohols which comprises protecting the OH group of the alcohol by esterification with a lower molecular carboxylic acyl radical, reacting the material at the double bond to introduce an OSO₂OH group and further reacting the material to replace the lower molecular acyloxy group of the ester with an OSO₂OH group.

11. The process of producing sulphuric acid esters which comprises reacting unsaturated alcohols with a carboxylic acyl chloride to effect esterification at the hydroxyl group and reacting the ester so obtained with acid of the group consisting of the concent rated sulphuric acid and chlorosulphonic acid to saturate the double bond and introduce an OSO₂OH group at the double bond position.

12. In the process of producing sulphuric acid esters the step which comprises reacting an unsaturated fatty ester containing a carboxylic acyl group with concentrated sulphuric acid at a temperature approximating 20 to 30° C. to introduce an OSO₂OH group at the double bond position and reacting the product with concentrated sulphuric acid at a temperature above 35° C. to replace the acyloxy group with an OSO₂OH group.

13. The method of producing sulphonated alcohols of high molecular weight which comprises treating higher molecular fatty alcohols containing at least a portion of unsaturated higher molecular alcohol with a carboxylic acylating agent adapted to react at the hydroxy radical of the alcohols to form esters having a lower solidification point than the free alcohols of said esters by heating the alcohols to a high temperature at which the acylating agent and alcohols form esters, cooling the reaction mass, and reacting it with a sulphonating agent at a temperature adapted to form sulpho products therefrom.

14. The process of producing sulpho-compounds from material of the group consisting of unsaturated alcohols and unsaturated hydroxy acids which comprises reacting such compounds with acetic anhydride to esterify the hydroxyl group, treating the esters so obtained with concentrated sulphuric acid to cause reaction at the double bond and treating the product to substitute an OSO₂OH group for the acyloxy group.

15. The process of producing dihydroxy compounds from material of the group consisting of unsaturated alcohols and unsaturated hydroxy acids which comprises reacting such material with acetic anhydride to esterify the hydroxyl group, treating the esters so obtained with sulphuric acid to introduce a sulphate group at the double bond position, treating the product to substitute an acid sulphate group for the acyloxy group to produce a sulphuric acid ester and hydrolyzing the sulphuric acid ester to substitute hydroxyl groups for the acid sulphate groups.

16. The process of producing sulphuric acid esters which comprises treating an ester of an unsaturated alcohol containing a carboxylic acyl group with concentrated sulphuric acid at a relatively low temperature to cause reaction at the double bond and reacting the product with concentrated sulphuric acid at a relatively high temperature to substitute an acid sulphate group for the acyloxy group to produce a sulphuric acid ester.

17. A saturated sodium sulphate salt of oleyl acetate in which the acetic radical is attached to the end of the oleyl chain and the sulphate radical is attached to the oleyl radical at a carbon atom adjacent the double bond position.

18. A compound of the general formula

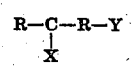

wherein R—C—R represents a high molecular alkyl radical, Y represents a lower molecular carboxylic acyl radical and X represents a neutralized radical selected from the group consisting of sulphate and sulphonate radicals.

19. A sodium salt of a reaction product of sulphuric acid and a carboxylic acylated unsaturated high molecular fatty alcohol.

20. A product produced by acetylating oleyl alcohol, the resulting ester then being treated with a strong sulphonating agent taken from the class consisting of sulphuric acid, chlor-sulphonic acid, and fuming sulphuric acid, the sulphated product then being neutralized with alkali to form a salt.

21. An addition product of sulphuric acid and a carboxylic acylated unsaturated high molecular fatty alcohol.

22. An addition product of sulphuric acid and an acetylated unsaturated high molecular fatty alcohol.

23. An addition product of sulphuric acid and acetylated oleyl alcohol.

24. An addition product of sulphuric acid and a carboxylic acylated unsaturated high molecular fatty alcohol, said addition product being neutralized with caustic soda.

25. The process of preparing sulphonated compounds which comprises reacting an acetylated unsaturated higher alcohol containing 10 or more carbon atoms with a strong sulphonating agent.

26. An addition product of sulphuric acid and acetylated unsaturated high molecular aliphatic alcohol having 10 or more carbon atoms in the molecule.

27. Water soluble compounds consisting of high molecular fatty hydrocarbon radicals of more than 10 carbon atoms having attached in the molecule an acetic acid ester radical and a neutralized sulphuric acid ester radical, said compounds being capable of forming clear aqueous foam producing solutions stable against precipitation by calcium chloride.

28. The compound consisting of a high molecular fatty hydrocarbon radical containing at least 10 carbon atoms having attached in the molecule a lower molecular carboxylic acid ester group and a radical selected from the group consisting of sulphate and sulphonate radicals.

29. The compound consisting of a high molecular fatty hydrocarbon radical containing at least 10 carbon atoms having attached in the molecule a lower molecular carboxylic acid ester group and a neutralized radical selected from the group consisting of sulphate and sulphonate radicals.

30. The compound consisting of a high molecular fatty hydrocarbon radical derived from a higher molecular aliphatic alcohol corresponding in number of carbon atoms to the fatty acid radical of and obtained from a member of the group consisting of natural fats and waxes having attached in the molecule an acetic acid ester radical and a sulphonate radical.

31. The process of preparing sulpho-compounds which comprises reacting a high molecular aliphatic hydroxy compound selected from the group consisting of hydroxy fatty acids and fatty alcohols, containing at least 10 carbon atoms in the chain with a carboxylic acylating agent and reacting the product obtained with a sulphonating agent.

32. The process of preparing sulpho-compounds which comprises reacting a high molecular aliphatic alcohol derived from a natural oily or fatty material with acetyl chloride, and reacting the product obtained with a sulphonating agent.

WALTHER SCHRAUTH.

CERTIFICATE OF CORRECTION.

Patent No. 2,163,133.　　　　　　　　　　　　　　June 20, 1939.

WALTHER SCHRAUTH.

It is hereby certified that error appears in the printed specification of the above numbered patent requiring correction as follows: Page 2, second column, line 74, claim 6, for "a carboxylic" read an; line 75, same claim, for "an" read a carboxylic; and that the said Letters Patent should be read with this correction therein that the same may conform to the record of the case in the Patent Office.

Signed and sealed this 8th day of August, A. D. 1939.

(Seal)　　　　　　　　　　　　　　　　　　Leslie Frazer,
　　　　　　　　　　　　　　　　　Acting Commissioner of Patents.